(12) United States Patent
Hellenthal (10) Patent No.: US 7,188,184 B2
(45) Date of Patent: Mar. 6, 2007

(54) INFORMATION SERVICE SYSTEM (75) Inventor: Markus Hellenthal, Boppard (DE)

(73) Assignee: Accenture Global Services GmbH, Schaffhausen (CH)

( * ) Notice: Subject to any disclaimer, the term of this patent is extended or adjusted under 35 U.S.C. 154(b) by 714 days.

(21) Appl. No.: 10/182,231

(22) PCT Filed: Jan. 5, 2001

(86) PCT No.: PCT/DE01/00090

§ 371 (c)(1),
(2), (4) Date: Jul. 24, 2002

(87) PCT Pub. No.: WO01/55902

PCT Pub. Date: Aug. 2, 2001

(65) Prior Publication Data

US 2002/0194255 A1  Dec. 19, 2002

(30) Foreign Application Priority Data

Jan. 27, 2000  (DE) ............................... 100 03 440
Sep. 28, 2000  (DE) ........................... 200 16 746 U (51) Int. Cl.
*G06F 15/16* (2006.01)
(52) U.S. Cl. .................. 709/229; 709/219; 709/228; 713/2; 713/152; 713/155; 713/186
(58) Field of Classification Search ................ 709/203, 709/229, 228, 219; 713/2, 152, 155, 186
See application file for complete search history.

(56) References Cited

U.S. PATENT DOCUMENTS 5,339,403 A    8/1994  Parker
5,844,987 A *  12/1998 Matthews et al. .......... 340/901
5,892,905 A    4/1999  Brandt et al.
6,028,514 A *  2/2000  Lemelson et al. ..... 340/539.13
6,078,282 A *  6/2000  Casey ................... 342/357.06
6,173,284 B1 * 1/2001  Brown ....................... 709/203
6,199,099 B1 * 3/2001  Gershman et al. .......... 709/203
6,205,484 B1 * 3/2001  Eriksson .................... 709/229
6,408,304 B1 * 6/2002  Kumhyr ..................... 707/102
6,611,822 B1 * 8/2003  Beams et al. ............... 709/205
6,694,366 B1 * 2/2004  Gernert et al. ............. 709/227
6,842,774 B1 * 1/2005  Piccioni .................... 709/207

FOREIGN PATENT DOCUMENTS

WO    WO 99/46711    9/1999

OTHER PUBLICATIONS

A. D. Angelica, "Business Data Finds a Home on Custom Portals", Techweek, Feb. 22, 1999, 4 pgs.
J. M. Firestone, "Enterprise Information Portals and Enterprise Knowledge Portals", DKMS Briefs Mar. 20, 1999, 6 pgs.

(Continued)

*Primary Examiner*—William Vaughn
*Assistant Examiner*—Phuoc H. Nguyen
(74) *Attorney, Agent, or Firm*—Brinks Hofer Gilson & Lione (57) ABSTRACT

An information service system is provided, particularly for use by the police. The information service system communicates with application devices used by the police and includes an intelligent and dynamically implemented portal for standardized access to downstream information systems, a terminal for access to the portal, and a communication device for linking the terminal with the portal.

21 Claims, 4 Drawing Sheets

OTHER PUBLICATIONS

N. Whitehead, "A New Era of Information Sharing", Enterprise Middleware, Xephon, May 1998, pp. 26-30.

Y. Zhao, "WebEntree: A Web service aggregator", IBM Systems J. vol. 37, No. 4, 1998, pp. 584-595.

Freytag, C., Neumann, "Resource Adaptive WWW Access for Mobile Applications", Computer & Graphics 23 (1999), pp. 841-848, www.elseview.com/locate/cag.

* cited by examiner

INFORMATION SERVICE SYSTEM

PRIORITY CLAIM

This application is a 35 U.S.C. §371 filing of International Patent Application No. PCT/DE01/00090 filed on Jan. 5, 2001. This application claims priority benefit of German Patent Application No. 10003440.3, filed Jan. 27, 2000 and German Patent Application No. 20016746.4, filed Sep. 28, 2000.

BACKGROUND

The present invention relates to an information service system, particularly for use by the police.

Despite excellent overall conditions, police departments in Germany and elsewhere are exposed to modern challenges, which are becoming increasingly difficult to handle using conventional means.

These challenges include both
  internal factors, such as restructuring within police organizations and increasing cost pressures, and
  external factors, such as an increase in complex criminal forms, such as white collar or organized crime and ever larger geographical policing areas (Germany, Europe) and an associated increase in cross-border crimes.

Such challenges can only be handled if the police are placed in a position to do so. The necessary access to relevant information only exists in fragmentary form; in Germany, for example, law enforcement consists of the police organizations of the 16 Federal German states, the German criminal investigation office, the German border police and the customs administration, which in part also handles police problems. German law enforcement agencies are unable to access information to an extent adequate for dealing with a particular task.

Therefore, the problem of the invention is to provide an information service system enabling a user, independently of the access channel available, to access in simple manner the instruments required by him, such as information and applications.

SUMMARY OF THE INVENTION

According to the invention, this problem is solved by an information service system with application devices, particularly for use by the police, with information systems, an intelligent and dynamically implemented portal for standardized access to downstream information systems with a scope dependent on the user, containing at least one terminal for access to the portal and at least one communication device for linking the terminal with the portal. The term intelligent portal is understood to mean a portal which also makes available its own functions. The term dynamically implemented portal is understood to mean a portal generated as a function of the context (e.g. date, time of day, special events, notified user, etc.). The counterpart is a static portal, which although regularly "filled" with new information, provides no flexible, context-dependent display.

The information systems can also incorporate an external and/or at least a local data bank, such as a data bank of a private or public organization.

The information systems advantageously incorporate at least one local media data bank.

It is also possible for the information systems to incorporate at least one local data warehouse, such as a data store containing image or video data.

The information systems advantageously incorporate at least one local device for an application. For example, the application can be used for use planning.

According to another special embodiment, the information systems incorporate at least one local office communication system. For example, the office communication system can be used for detecting, processing, sending and administering documents, and for receiving, producing, sending and documenting e-mails.

The portal can also incorporate a server.

Advantageously the portal incorporates an engine layer with at least one engine on a layer with an administration device for administering users, the configuration of engines and the administration of upstream and downstream layers. The engines are machines for fulfilling certain portal tasks.

In an upstream layer, the portal preferably incorporates a device for authenticating a user and the server. It is a hardware layer which is used for establishing who is communicating with whom.

The authenticating device advantageously also incorporates a user identifying device.

In an upstream layer, the portal advantageously incorporates an authorization control and storage device for regulating the extent of access granted to a user. The authorization control can take place via user and user group rights.

Advantageously, the portal has a device for displaying use possibilities of the portal as a function of the external context, such as the date, time of day, user and special events.

According to another special embodiment of the invention, the portal in the upstream layer can incorporate a device for encrypting the data transmitted via the communication device and for decrypting the data received via the communication device. Such a device is used to protect sensitive data pollable via the information service system against unauthorized interception.

Advantageously the portal also incorporates a device for providing or establishing the integrity of the data transmitted and received via the communication device. This is intended to prevent or prove an inadmissible manipulation of the transmitted data.

According to another special embodiment of the invention, the engine layer incorporates a subscription engine for subscribing to information, lists, and further services through a user. Thus, a user can inform the information service system of his interests (active personalization) and receive information about his fields of interest upon logging in.

The engine layer advantageously incorporates a filter engine. On the basis of predetermined criteria, the filter engine can investigate different information areas for the particular user. Thus, as soon as a user carries out a personal, factual, or other type of poll or interrogation, the filter engine accesses its known information sources and compiles a list from all the search results.

It can also be provided that the engine layer incorporates an information repository engine and/or an application repository engine and/or office communication repository engine. The information repository engine can contain a metadata structure of the downstream information systems and path information for access to the same. The information repository engine is used by services for which the storage location is not relevant, but the type of information such as a fact, person, etc., is. Thus, for example, personal information is stored in different information systems, such as those located in provincial and national criminal investigation offices and Interpol. Instead of supplying the information to all these services which have information systems containing personal information, it is sufficient on the basis of the "person" inquiry to determine all the necessary storage locations via the information repository engine. An application repository engine contains a list of applications made available to the users of the information service system via the portal in downstream information systems. Besides the location of the application, it also contains information on both the user and user group rights necessary for access. For example, if a police officer desires access to INPOL, then that access is admissible as a result of his user group membership and the connection to INPOL is granted and established. However, if a magistrate wishes to access INPOL, access is refused, because as a result of his user group membership, the magistrate does not have the proper authorization. In the case of extended powers granted to the magistrate, authorization can be given to INPOL on the user plane and once again access to INPOL is made possible. The office communication repository engine offers standardized access to a local office communication system and its associated functions.

Advantageously, the portal incorporates an output engine whereby a user is given the possibility to obtain information objects via different access channels and in different formats.

Advantageously the portal incorporates an interface integrator for downstream information systems. Thus, the portal must assist different interfaces, because in large organizations, such as a police organization, access to the most varied information systems is necessary. These include, in addition to the different platforms and system architectures, different information sources, data displays and data banks, such as relational and multidimensional data banks and unstructured data memories. This also implements interfaces to the data warehouse and data mining system.

Preferably the portal incorporates at least one multivalent or value-added service system. The value-added service system offers a specific service and is part of the portal and consequently does not belong to a downstream information system. Each value-added service system controls the access authorization itself; for example, upon calling up such a system, the system checks the access authorization using the user profile and the necessary authorizations for the value-added service to establish whether the user or user group rights are adequate for the use of the said service. If authorization is inadequate, access to the value-added service is refused.

The portal advantageously also contains a request broker, which on the basis of the nature of the user inquiry, allocates the same to the correct engine, and after running the inquiry, then ensures that the information obtained is transmitted back to the correct user.

Another special embodiment according to the invention is characterized by a firewall machine between the portal and the at least one communication device. It serves to implement a firewall and monitors the entire data traffic between the terminals and the portal in order to prevent unauthorized penetration of the information service system, the introduction of virus programs, and similar attacks.

Finally, a special embodiment of the invention is characterized by a firewall machine between the portal and the downstream information systems, which has the same function as the previously described firewall machine, but relative to the portal-downstream information system transition.

The invention is based on the surprising finding that via a standardized access, namely the portal, the available data and application devices of varied organizations can be easily accessible and each police officer, independently of the access channel, is able to obtain function-related information allowing the officer to fulfill his task. The portal also allows the linking of information rendered accessible by the application devices, so that these can be made an indirect component of the portal. By producing the connection of data from existing information systems and application devices, a new information quality can be created and thus provides an added value for the police. The necessary information is displayed in context so that law enforcement is better able to fulfill its functions, thus allowing for strategic aims to be more logically implemented.

In addition, the use of a portal, besides the integration of existing information systems and application devices, also permits the identification, implementation and integration of future information systems and application devices. New information systems and application devices built according to the architecture of the described information service system can be made available in a simple, standardized manner and linked with existing information systems. Thus, the police may be assisted in additional areas where, as a result of a lack of instruments, potential for improvement exists. As examples, operative control, risk management or training instruments, and knowledge applications may be integrated.

BRIEF DESCRIPTION OF THE DRAWINGS

Further advantages and features of the invention can be gathered from the claims and the following description of an embodiment illustrated by the attached drawings.

DETAILED DESCRIPTION

Figure 1:
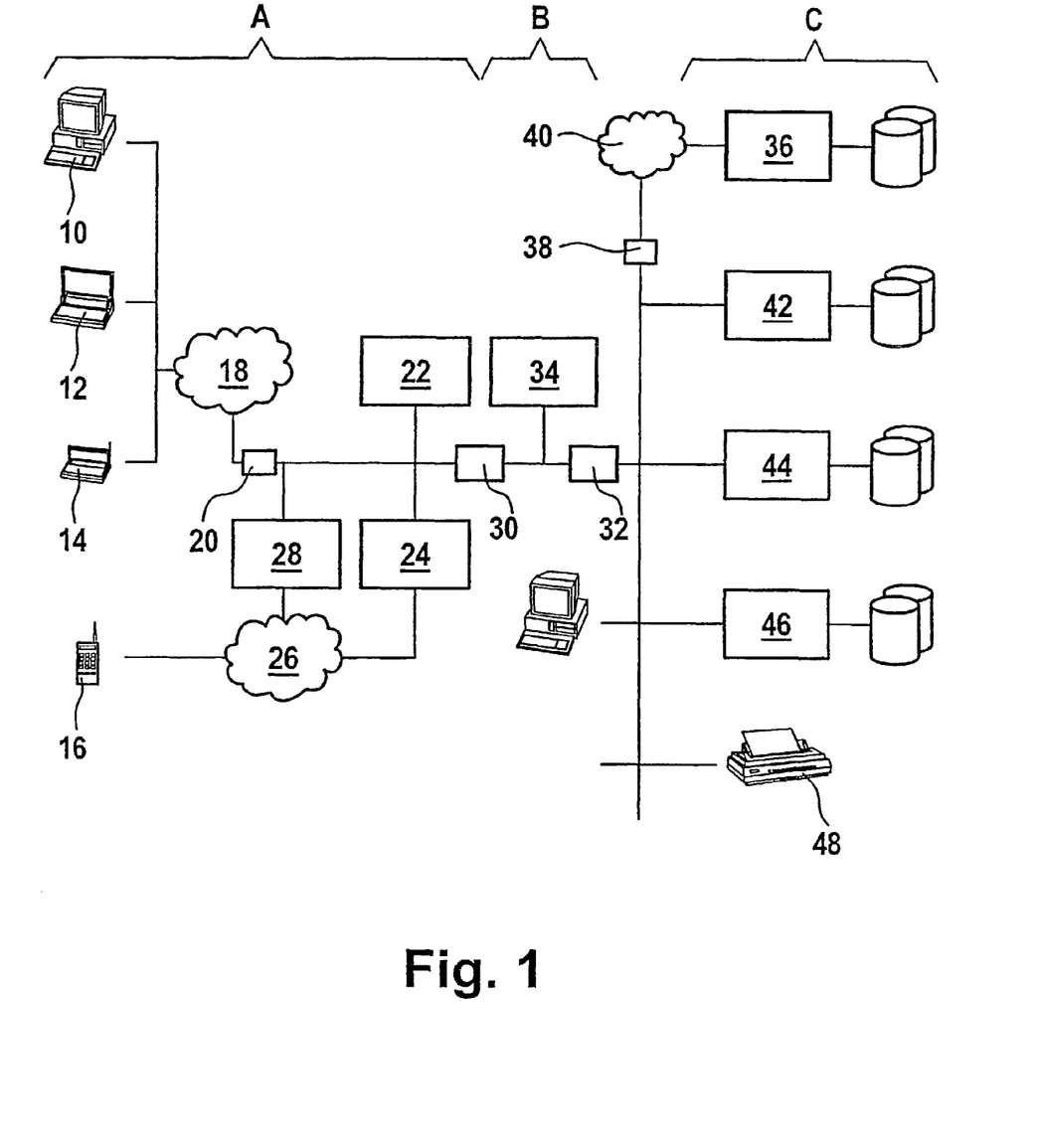
FIG. 1 shows the technical architecture of an information service system.

FIG. 1 diagrammatically shows the technical architecture of a special embodiment of an information service system according to the present invention. The information service system can be subdivided into three components, namely A: access channels, B: intelligent portal and C: downstream information systems. The access channels are used for producing access to an intelligent, dynamically implemented portal and are implemented by terminals 10 to 16 and communication devices. With regard to the access, a distinction is made between a local access, a location-independent access by means of a mobile PC, location-independent access with terminals capable of transmitting data and location-independent access with terminals unable to transmit data. Thus, any authorized user can alternately use any random access channel.

With a local access, users have fixed, location-bound operating positions, as represented by terminal 10 in the form of a PC. The communication device for linking the terminal with the portal B incorporates a remote data transmission device 18 in the form of a telephone fixed or mobile radio network, a router 10 (unction computer between data networks) and the Internet and with respect to the latter use is made of web browsers having a HTML basis and standardized TCP/IP networks as the network layer. In FIG. 1 a HTTP server 22 represents the Internet and allows a continuous, standardized use of office communication systems.

A location-independent access with mobile PCs have full-value, but not location-bound operating positions, like the terminal 12 in FIG. 1 in the form of a laptop or notebook. The communication device for linking the terminal 12 with the portal B looks the same as in the case of terminal 10. As compared with a PC located at a fixed location (see terminal 10), a terminal 12 offers the possibility that a user is able to dial into the portal B via communication mechanisms of the laptop or notebook from different locations and may make available the same functions as those of a stationary PC.

In the case of a location-independent access with terminals capable of transmitting data, such as terminal 14, an associated communication device incorporates a remote data transmission device 18 in the form of a mobile radio network, a router 20 and a WAP (Wireless Application Protocol) server 24 with a WAP browser based on WML. Standardized TCP/IP networks are used as the network product.

Finally, standard mobile radio telephones represent an example for terminals 16 which are not able to transmit data and permit a location-independent access. The associated communication device for a standard mobile radio telephone incorporates a remote data transmission device 26 in the form of a mobile radio network and an IVR (Interactive Voice Response) server 28, such as an interactive voice system enabling a user to selectively poll information and also received information in planned form. If the terminal 16 is WAP-capable, the information can also be polled and received by the WML-based WAP server 24.

In each case a firewall machine 30 or 32 is placed between the access channels A and the portal B and between the portal B and the downstream information system C. The portal B incorporates an application server 34. The downstream information systems C incorporate an external data bank 36, e.g. INPOL, which is accessible through a router 38 and a WAN (Wide Area Network) 40, a local device 42 for an application, e.g. use planning, a local office communication system 44, a local data warehouse 46 and a printer 48.

As a result of the sensitivity of the data available through the information service system, the security aspect is of great importance. The term security in the context of network-based applications consists of the following elements:

a) Server and client-side authentication—who is communicating with whom?

b) Authorization—what access authorization does the inquiring user have?

c) Data security—can the data transmission be intercepted?

d) Data integrity—is the arriving data the same as the transmitted data?

It is not possible for any random user to directly access all data available via the portal. Access to the information is fundamentally subdivided into three different security zones (cf. FIG. 2):

Internet

All undefined users without authorization to sensitive data and having a guest status can enter this zone. Access is only possible on the static side making available general information via the information service system. The only contact possibility in this security zone consists of an e-mail to the operator of portal B, and no content personalization is possible.

Extranet

Figure 2:
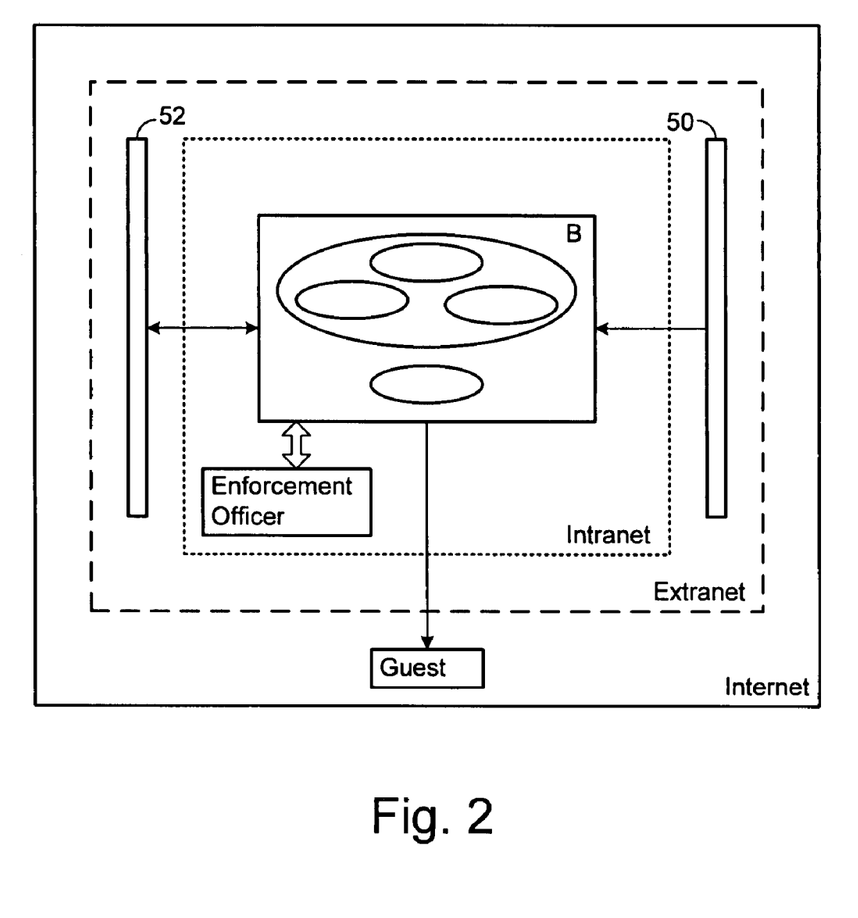
FIG. 2 shows safety zones resulting from different access authorizations.

All trusted users 50, 52 of the information service system are able, following authentication, to dial contents. Only part of the users, namely the user 52, has the possibility to poll contents. All private and public organizations that do not belong to the police can enter the Extranet.

Intranet

All internal police users can enter this security zone. Following authentication, there is a personalized build-up of portal B. In this security zone, there is reading and writing access to all information systems authorized for the user. In order to obtain a high-security standard, the server and client-side authentication referred to hereinbefore under a) can take place as follows:

Access via terminals capable of transmitting data

To ensure that the desired application server 34 is reached by an authorized client (user), the following procedure can be adopted:

1. Inquiry via HTTP server 22 or WAP server 24;

2. Acknowledgement of portal B with certificate, public key (asymmetrical encryption method) and signature;

3. Client-side production of a session key for the actual connection;

4. Encrypting the session key with public key of portal B;

5. Dispatch to application server 34;

6. Decryption of the session key with a private key of the information service system;

7. Request to identify the client via symmetrical encryption (session key);

8. Identification of the user as a function of the security zone: no identification is needed if a user belongs to the security zone (Internet), whereas an identification procedure is necessary if a user belongs to the Extranet or Intranet security zones. In the case of guest access, no identification is necessary, whereas with Extranet access, identification can take place via user names and passwords, and with Intranet access the identification can take place in the form of a user name/chipcard in conjunction with a biometric method (fingerprint, voice analysis, iris analysis); and, 9. Granting access after identification in application server 34.

In the case of access via terminals which cannot transmit data (voice connections), the server and client-side authentication can take place as follows:

1. Dialling in via a fixed access number of the information service system;

2. Inputting the user identification via a telephone keyboard, assuming a MFW-capable telephone;

3. Additional identification via the voice; and

4. Caller number registration

The authorization referred to under b) can take place on the application plane within the portal B, such that every user has a profile enabling him to access certain functions. Unlike optimistic control, where access rights are taken away from the user and from the outset has all possibilities, authorization here is pessimistically controlled. Access rights must be expressly allocated to a user.

The authorization control takes place by means of user and user group rights, at least one user group being associated with each user. Compared with user group rights, user rights have a higher priority. For example, if a user is not authorized on the basis of a user group membership to use a specific application, the user may personally be given authorization to the application by setting specific user rights. In other words, authorization to access the application is made at the user level rather than the group level.

Authorization storage takes place as a function of the security zone:

Internet

The user only has guest access and cannot dial any applications. The storage of the access rights takes place in a data bank as a "guest" profile of the "guest" user group.

Extranet

The user has a personalized access, i.e., he must make an application in the information service system, and access to police applications is refused. Access to content management applications is permitted. Storage takes place in a data bank for each user name and for a specific user group, such as "transport operators", "diplomats", etc.

Intranet

The user has a personalized access and generally has the function of a police officer or magistrate. Access to police and other applications is partly to fully allowed. Storage takes place in a data bank per user name and for one or more specific user groups, such as e.g. "police officer", "office manager", etc. As the user circle normally also has direct access to the file system (office communication, etc.), a profile is also linked with the user profile of the operating system (NT, LDAP, etc.).

The data security referred to under c) is produced by means of an encryption mechanism, which encrypts and decrypts all data transmitted and received via an active session. A session begins with the logging in of the user and ends as soon as a user has logged off or has not been active for a defined time, e.g. 30 minutes. Encryption takes place by means of a symmetrical procedure and for this purpose, both sides require an identical key. The latter is produced as described under a) and is only valid for one session.

In conjunction with the data integrity referred to under d), a distinction must be made between transfer of HTML/WML data and e-mails. In the former case, data integrity security takes place by encrypting the transmitted data with an individual symmetrical key for each session. In the latter case security is provided in two steps: First, the transmitted data are encrypted as in the first case; and second, each e-mail receives a sender signature.

Hereinafter and with reference to FIG. 3 further details will be given on the functional systematics of the intelligent, dynamically implemented portal B. It is a dynamic portal because the contents of the portal are displayed as a function of the external context, which comprises the following elements:

date, time, user, special, police-relevant events.

The portal B assumes the function of an intermediary of the user, bound to the portal B by one of the aforementioned access channels and the downstream information systems of the police. The intelligent portal B has different tasks, which are implemented by means of different engines. To ensure that users are supplied by said engines with the desired data important and necessary for them, in an upstream layer in a device 54 there is an authentication or personalization for the purpose of authenticating and identifying a user. Following this in an engine layer there is a subscription engine 56, a filter engine 58, an information repository engine 60, an application repository engine 62 and an office communication repository engine 64, the functions of which were described hereinbefore. The filter engine and subscription engine represent intelligent agents. The engines for the purpose of fulfilling their engine information area functions, communicate via fixed, specified interfaces with different information processing systems operating in the background.

The engine layer is located on a layer with an administration device (not shown) for administering users, engine configuration and administering upstream and downstream layers.

The downstream systems C incorporate two external data banks 36*a*, 36*b* of a private and a public organization, a local application device 42, a local office communication system 44, a local data warehouse 46, a local media data bank 43 and local data banks 45.

Figure 3:
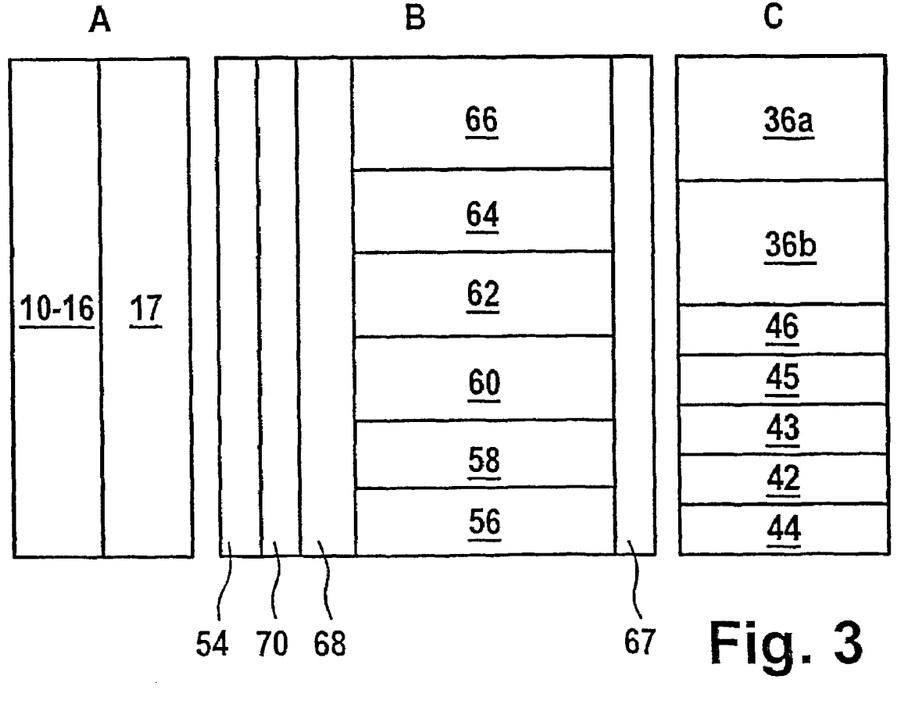
FIG. 3 shows the functional systematics of the information service system of FIG. 1.

The components shown in FIG. 3 completely cover the different police task fields. Access to the different applications and value-added services, in which one is shown and given the reference numeral 66, through the portal B, is controlled by the association of user and user group rights. Thus, each officer is provided with those applications which he requires for fulfilling his specific functions. As a result of the integration of these components in the information service system, they are displayed in their sense context. This facilitates the linking of the existing data with information.

On the basis of the inquiry, a request broker 68 associates it with the correct engine and after running the inquiry ensures that the information obtained is transmitted back to the correct user. By means of an output engine 70 the user is given the possibility of obtaining information objects via different communication channels in different formats. There is also an interface integrator 67.

Portal B permits the implementation of the idea of the operative work of the police. With a standardized access, namely the portal, the different application devices (legacy systems) of the police are rendered accessible and interlinked and consequently become an indirect part of the portal. It is important to produce the context from the data of the existing application devices, in order to give a new information quality and therefore generate the additional service necessary for the police. The necessary information is displayed in context making the police better able to fulfill their functions and enabling strategic aims to be more logically fulfilled.

Besides the integration of existing application devices on the basis of the above-described portal architecture, the invention also includes the identification, implementation and integration of future application devices in the portal.

New application devices built according to the presently described architecture can be made available in a simple, standardized manner and linked with existing information systems. Thus, the police can be assisted in those areas where, as a result of lack of instruments, potential for improvement exists. For example, it is possible to integrate and control risk management instruments or training and knowledge application devices.

As a result of the integrative aspect of the portal, information from different applications is interlinked and made available, as needed, by users. It is therefore possible to gather use recommendations and handling alternatives from present case data and filed information on past cases. Another example would be the information side provided in geographically regionalized and user group-related manner. Thus, an officer is acquainted with existing, regional police-relevant events such as when he requires search information on local events and activities. These so-called value-added services are created by intelligent linking and representation of given data values in the form of aggregated and selected information for the police.

The information service system may include a starting page containing links to the integrated applications and value-added services. The links are grouped into integrated applications, value-added services and personal applications. The personal applications include not only e-mail, use planning and local events, but also personal search agents resulting both from integrated applications and value-added services. The aforementioned components are the most frequently utilized portal components, and must therefore be made the most easily available.

The intelligent portal links existing or future police applications and creates additional value from given data as a result of a common surface and integrated services. The individual components can be existing applications, which could also exist independently, such as e-mail or an operative information system, or future applications, which are then integrated in the portal.

The integration of applications from the following areas is possible for comprehensively assisting police tasks.

Target-oriented Control

This application case covers all evaluations of operative data for detailed use planning, including (a) the determination of information, (b) linking information, (c) geographical representation of information (regional evaluation of facts) and (d) making available information for controlling and risk management.

Operative Information and Control System

This application case covers the provision of control information, which can be subdivided into the following:

(a) Internal result, e.g. debit note;

(b) External result, e.g. clearing up rate, subjective feeling of security, recurrence figures;

(c) Processes, e.g. ratio of value-creating to administrative activities, average clearing up period, ratio of arrests to convictions; and, (d) Organization, e.g. sick rate, attended training programs, number of implemented improvements.

The innovation includes the availability and attainability of information. At present, such information is determined manually and then sent via e-mail to the party in question and other persons. Integration by means of the information service system portal means that the relevant information is made available to the given parties by subscription or search and using the portal.

Competency

The "competency" application case relates to training measures which can be offered via the portal. As a result of the technology used, the office is able, as required, to attend training offers on-line in his working environment. These training offers include interactive learning programs passing from electronic reference works via simple dialogue-controlled training, and finally extending to media training.

Administrative Assistance

Administrative assistance by the portal covers all tasks linked with cases and all personal and administrative activities, which are necessary, but take up a large amount of time. As a result of the use of the portal, there is an integration of available information resources; as a result of that integration, an efficiency increase is obtained. An example is the direct obtaining of information at the location of the event, followed by the obtaining of further specific information, and finally the administration of the information in the form of individual reports. In the specific example the portal directly renders available all the necessary information, and this can be further processed at another location without previously acquiring the information again. At present, such information is polled by radio, thus requiring an additional officer. Subsequently, the information is noted and extended by more specific information. The latter is passed by radio to another officer (e.g. team leader) and noted. On adding further information, collation takes place, and in the least favorable case, the initial information inquiry is repeated.

Each officer also has personal administrative tasks and these can be simplified by different applications integrated into the portal. Through the personalization of information relevant to the officer, he can be automatically supplied therewith. There is no need for the officer to personally obtain this information. For example, an officer can be automatically supplied with new training offers for his special field.

Value-added Services

These services are those allowing information polling and the acquisition of actual data. For example, actual data can be acquired and transmitted in situ, i.e. in the office or at the location of the event. Aggregation categorization and evaluation of the data are automated. The evaluations obtained in automated form are then supplied to the particular officer as a function of the personalization mechanisms. This process can take place by the provision of the value-added just-in-time service. Up to now, the procedure has required multiple manual activity and has taken 24 or more hours.

Hereinafter, details are given of a possible application of the information service system according to the invention. This application relates to the integration of the information service system into the everyday activities of police officers equipped with a terminal in the form of a WAP-capable device. It is also used for illustrating how an officer is provided with an added value by the portal as a result of the integration of information systems, which he cannot have without said portal.

At the start of his shift in the first district of his home town Schdnstadt, Peter Sicher and his colleague Zabel travel with a service vehicle to the district allocated to them via the information service system.

(a) Sicher switches on the WAP-capable device installed in the vehicle. On reaching the target area, they receive the information that the duty roster has changed due to the loss of two colleagues and they are to be dispatched in a different district. As the two do not have information on this new district, they call up the value-added "risk management" service of the information service system, whereby both learn that over the last few months in this quiet area increasing numbers of burglaries have occurred. Although a precise demarcation of the area has been possible, up to now no suspects have been found. Sicher and Zabel decide to show a greater presence in the area in question.

(b) In his personal subscription, Sicher acquires the information that in four weeks, a training course in his special field of "procurement crime" will be available. He immediately applies for it and is automatically informed that a place has been reserved for him. Documents are automatically sent to his electronic post box and the training course is noted in the use planning system. Sicher's supervisor receives an electronic communication immediately confirming enrollment in the office.

c) After entering a side street, Zabel notes that a vehicle has been unlawfully parked on the pavement, and upon closer examination, finds that the vehicle is not locked. By means of the information service system portal B, he polls the INPOL data bank 36c the registration details of the vehicle (cf. FIG. 4), but no messages are provided. The filter engine (not shown) supplies him with the message that the vehicle owner is being sought in the EUROPOL data bank 36d. However, there is no entry in the INPOL data bank 36c.

Figure 4:
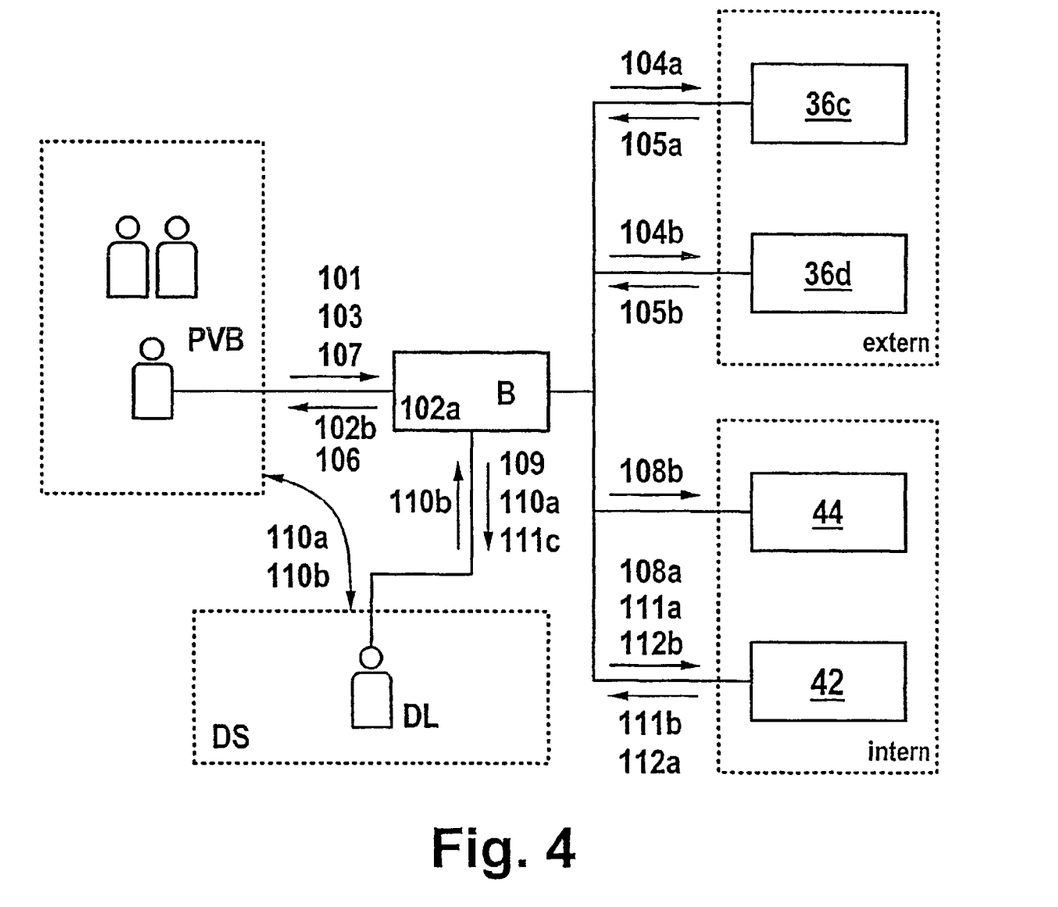
FIG. 4 shows a use example of the information service system of FIG. 1.

Zabel records the location of the vehicle and passes the information back to the office DS. By radio transmission, he contacts the team leader who has in portal B the established information and also the EUROPOL information. The team leader makes all the necessary arrangements and Sicher and Zabel are instructed to park their vehicle in the vicinity and await further instructions.

At the end of the day, the service manager DL receives an evaluation of all incidents of the day in question by means of the local device 42. On the basis of this information, he decides about the necessary adaptations of the duty roster for the following day. Duty roster adaptations are secured, and the police officers are then automatically informed of the changes.

(d) Back in the office DS, Sicher and Zabel make the necessary reports using the local office communication system 44. They make use of the entries recorded during the day. Most of the work has already been completed, as these are usually standard procedures. The cases encoded in situ are already available in printed-out form in their filing compartments.

Four applications of the information service system were described above. Each application case reveals a special function only available to a limited extent or not available in the police service at present:

(a) Direct information on a data evaluation;
(b) Direct information on personal interests/requests;
(c) Intelligent integration of different systems and integration of information for further processing; and,
(d) Further use of mobile-acquired data for efficient processing of standard procedures.

FIG. 4 shows the information flows between a user, namely Sicher and components of an information service system corresponding to the previously described application case. The reference numerals have the following significance:

101: Authentication
102a: Personalization
102b: Portal display
103: Registration plate search enquiry
104a: INPOL search engine
104b: EUROPOL search engine
105a: INPOL answer
105b: EUROPOL answer
106: Message back to Zabel
107: Determination of facts
108a: Securing data/metadata
108b: Standard report generation
109: Standard report and data to team leader
110a: Radio contact between Zabel and team leader
110b: Team leader instructions to Sicher and Zabel
111a: Daily evaluation subscription engine
111b: Daily evaluation production
111c: Daily evaluation to team leader
112a: Further use planning
112b: Securing use planning The features of the invention disclosed in the description, drawings and claims can be essential to the implementation of the different embodiments of the invention, either individually or in combination.

The invention claimed is:

1. An information service system which controls access to multiple types of applications, comprising:

information systems which support multiple types of integrated law enforcement applications, including personal applications, law enforcement competency applications, and law enforcement administrative applications;

a portal for standardized law enforcement access to the information systems; wherein the portal comprises a content display which is a function of time, date, and a portal user, and wherein the portal comprises an application server operable to subdivide access to the information systems and applications into multiple security zones in which user identification is a function of the security zones and in which the multiple security zones comprise:

an Internet security zone which implements guest access to the information systems without implementing an identification procedure;

an Extranet security zone which implements trusted access to the information systems and through which access is granted to a first type of application and access is refused to a second type of application in the multiple types of applications and that implements a username and password identification procedure; and an Intranet security zone which provides law enforcement terminal access to both the first and second types of applications and that implements a username and biometric identification procedure for authorizing law enforcement access to the multiple types of the integrated law enforcement applications; and wherein portal provides integrated access to the multiple types of integrated law enforcement applications according to the security zones; and wherein the law enforcement competency applications are operable to deliver an interactive learning program training offer to the portal user and operable to reserve a training place for the portal user.

2. An information service system according to claim 1, characterized in that the information systems Incorporate at least one data bank.

3. An information service system according to claim 1, characterized in that the information systems incorporate at least one local media data bank.

4. An information service system according to claim 1, where the competency application is operable to reserve the training place in response to an application from the portal user.

5. An information service system according to claim 1, further comprising a firewall between the portal and the information systems.

6. An information service system according to claim 1, where the portal further comprises an authentication device for authenticating the portal user.

7. An information service system according to claim 1, where the personal application comprises a personal search agent.

8. An information service system according to claim 1, where the law enforcement administrative application comprises an administrative reporting application.

9. An information service system according to claim 1, further comprising a subscription engine through which the portal user subscribes to an information list.

10. A method for controlling access to multiple types of applications, the method comprising:

establishing information systems which support the multiple types of integrated law enforcement applications, including personal applications, law enforcement competency applications, and law enforcement administrative applications;

establishing a portal to the information systems for standardized law enforcement access, including an application server;

providing, with the portal, a content display which is a function of time, date, and a portal user;

with the application server, subdividing access to the information systems and applications into multiple security zones in which user identification is a function of the security zones and in which the multiple security zones comprise:

an Internet security zone which implements guest access to the information systems and applications without implementing an identification procedure;

an Extranet security zone which implements trusted access to the information systems and applications, and through which access is granted to a first type of application and refused to a second type of application in the multiple types of applications and that implements a username and password identification procedure; and an Intranet security zone which allows law enforcement terminal access to both the first and second types of applications and that implements a username and biometric identification procedure for authorizing law enforcement access to the multiple types of integrated law enforcement application;

providing integrated access to the multiple types of integrated law enforcement applications through the portal according to the security zones;

delivering a training offer for an interactive learning program from the law enforcement competency application to the portal user; and reserving a training place for the portal user.

11. The method of claim 10, where establishing the information systems comprises establishing a media data bank.

12. The method of claim 10, where establishing the information systems comprises establishing a local office communication system.

13. The method of claim 10, where reserving comprises:

reserving a training place for the portal user in response to an application from the portal user.

14. The method of claim 10, further comprising:

establishing a firewall between the portal and the information systems.

15. The method of claim 10, further comprising:

establishing an authentication device for authenticating the portal user.

16. The method of claim 10, where the personal application comprises a personal search agent.

17. The method of claim 10, where the law enforcement administrative application comprises an administrative reporting application.

18. An information service system according to claim 1, where the portal comprises value-added service systems.

19. An information service system according to claim 18, where the portal further comprises a request broker operable to allocate a user enquiry between the value-added service systems.

20. An information service system according to claim 1, where the portal further comprises an output engine operable to deliver information objects through different access channels in different formats.

21. An information service system according to claim 1, where the portal is operable to provide geographically regionalized information to the portal user.

* * * * *

UNITED STATES PATENT AND TRADEMARK OFFICE
CERTIFICATE OF CORRECTION

PATENT NO. : 7,188,184 B2
APPLICATION NO. : 10/182231
DATED : March 6, 2007
INVENTOR(S) : Markus Hellenthal It is certified that error appears in the above-identified patent and that said Letters Patent is hereby corrected as shown below:

On the Title Page, Item (30)

"Foreign Application Priority Data" after "100 03" delete "440" and substitute --440.3-- in its place.

"Foreign Application Priority Data" after "200 16" delete "746 U" and substitute --746.4-- in its place.

In column 1, line 21, before "internal factors" insert -- - -- (dash).

In column 1, line 23, before "external factors" insert -- - -- (dash).

In column 4, line 62, after "a router 10" delete "(unction" and substitute --(junction-- in its place.

In column 5, line 56, before "All undefined users" insert -- - -- (dash).

In column 5, line 64, before "Extranet" insert -- - -- (dash).

In column 6, line 3, before "Intranet" insert -- - -- (dash).

In column 7, line 3, before "Internet" insert -- - -- (dash).

In column 7, line 7, before "Extranet" insert -- - -- (dash).

In column 7, line 14, before "Intranet" insert -- - -- (dash).

In column 7, line 47, before "date, time" insert -- - -- (dash).

In column 7, line 48, before "user" insert -- - -- (dash).

UNITED STATES PATENT AND TRADEMARK OFFICE
CERTIFICATE OF CORRECTION

PATENT NO. : 7,188,184 B2
APPLICATION NO. : 10/182231
DATED : March 6, 2007
INVENTOR(S) : Markus Hellenthal It is certified that error appears in the above-identified patent and that said Letters Patent is hereby corrected as shown below:

In column 7, line 49, before "special, police-relevant events" insert -- - -- (dash).

Signed and Sealed this

Seventh Day of August, 2007

JON W. DUDAS
*Director of the United States Patent and Trademark Office*